United States Patent [19]

Zelczer

[11] Patent Number: 4,545,524
[45] Date of Patent: Oct. 8, 1985

[54] ZONE CONTROL APPARATUS FOR CENTRAL HEATING AND/OR COOLING SYSTEMS

[76] Inventor: Alex Zelczer, 3840 Severn Rd., Cleveland Hts., Ohio 44118

[21] Appl. No.: 554,952

[22] Filed: Nov. 25, 1983

[51] Int. Cl.⁴ .......................................... G05D 23/00
[52] U.S. Cl. .................................. 236/46 R; 165/22; 236/49
[58] Field of Search ............... 236/49, 51, 46 R, 1 B; 165/22, 12; 137/624.18, 624.2; 251/61.1; 237/8 R

[56] References Cited

U.S. PATENT DOCUMENTS

| | | | |
|---|---|---|---|
| 2,530,563 | 11/1950 | Baxter et al. | 236/1 |
| 3,320,750 | 5/1967 | Haise et al. | 61/12 |
| 3,580,238 | 5/1971 | Diehl | 251/129 |
| 3,889,045 | 6/1975 | Logsdon | 174/70 R |
| 3,990,464 | 11/1976 | Jenkins | 137/1 |
| 4,029,128 | 6/1977 | Yamagishi | 138/89 |
| 4,147,298 | 4/1979 | Leemhuis | 236/49 |
| 4,160,464 | 7/1979 | Ballinger | 138/93 |
| 4,200,910 | 4/1980 | Hall | 165/22 X |
| 4,243,174 | 1/1981 | Moeller et al. | 236/46 R |
| 4,279,381 | 7/1981 | Yueh | 237/56 X |
| 4,284,126 | 8/1981 | Dawson | 236/51 X |
| 4,288,990 | 9/1981 | Schultz | 236/46 R X |
| 4,293,028 | 10/1981 | Knoll | 165/22 X |
| 4,313,560 | 2/1982 | Stiles | 165/22 X |
| 4,356,963 | 11/1982 | Edwards et al. | 236/49 |
| 4,390,959 | 6/1983 | Cabou | 236/46 R X |
| 4,407,447 | 10/1983 | Sayegh | 236/49 |

Primary Examiner—William E. Tapolcai
Attorney, Agent, or Firm—Maky, Renner, Otto & Boisselle

[57] ABSTRACT

A zone control apparatus for central heating and/or cooling systems having a central fluid heating and/or cooling plant and conduits for directing the heated or cooled fluid to the rooms in a house or other building being serviced by the system. The zone control apparatus comprises one or more flow control devices operatively associated with respective fluid conduits in the central heating and/or cooling system, and a cycle controller for cycling the flow control device or devices between high and low (or no) flow conditions at times strategically selected to correspond to periods of high and low use of the room or rooms with which the flow control devices are respectively associated. Accordingly, the apparatus operates automatically to eliminate unnecessary heating or cooling of individual rooms or zones during cyclical periods of low or no use whereby substantial energy savings and other benefits may be obtained with minimal compromise in comfort. In particular, the zone control apparatus may operate on the system to isolate or separate daytime and nighttime use areas or zones of the house for selective heating or cooling only during their respective daytime or nighttime use or anticipated use periods. Moreover, the zone control apparatus may be easily installed in existing systems as a retrofit or in new installations.

28 Claims, 19 Drawing Figures

ZONE CONTROL APPARATUS FOR CENTRAL HEATING AND/OR COOLING SYSTEMS

This invention relates generally to central heating and/or cooling systems for residential and commercial installations and, more particularly, to zone control apparatus for such systems.

BACKGROUND

Central heating and/or cooling systems typically employ a central fluid heating and/or cooling plant and respective conduits for directing the heated or cooled fluid to the rooms, offices, etc. in the house, unit or commercial building being serviced by the system. In forced air systems, a furnace and/or air conditioner is employed to heat or cool air which is forced through air ducts to the various rooms. In forced water systems, a water heater and/or cooler is employed to heat or cool water which is pumped through pipes to heat exchangers located in the various rooms. Steam heating systems are akin to hot water systems except that a boiler is employed to generate steam which is directed by pipes to radiators located in the various rooms.

In such systems, usually a single thermostat located in one of the heated or cooled rooms is employed to control operation of the system. The thermostat may be set to desired room temperature whereupon the system operates automatically to maintain such temperature in the room containing the thermostat. At the same time, the other rooms, offices, etc. being serviced will be heated or cooled, but without provision for automatic individual temperature control.

In houses, other residential units and commercial buildings employing such systems, the various rooms thereof typically are heated or cooled both day and night. Consequently, rooms (or zones consisting of one or more rooms) are heated or cooled during daily periods of minimal or no use. For example, the bedrooms in a house continue to be heated or cooled during the daytime when most activity occurs in the non-sleeping areas of the house such as the living room, dining room and kitchen, whereas the latter areas continue to be heated or cooled along with the bedrooms at night. In commercial buildings, unused offices or other daytime use rooms may continue to be heated just to maintain a comfortable environment in localized maintenance and/or security areas or rooms. Obviously, the heating or cooling of a room or zone not in use or having minimal use for a substantial portion of the day is of minimal benefit and a waste of energy in a practical sense.

In view of the foregoing, considerable energy savings could be obtained with minimal compromise in comfort by eliminating unnecessary heating or cooling of rooms during cyclical or daily periods of low or no use on a room by room or zone by zone basis. Although individual control of room heating or cooling may to some extent be obtained by going from room to room and opening or closing the air vents in the case of forced air systems or heat exchanger valves in the case of water or steam systems, such practice is tedious, subject to forgetfulness or tardiness, and overall inconvenient. Also, loose or poorly fitting closures for the air vents would reduce potential savings. This practice of course is contingent upon each room or zone having a shut-off device. Moreover, there is no provision for preheating a room or zone prior to use absent advance manual attention thereto.

SUMMARY OF THE INVENTION

The present invention provides a zone control apparatus for central heating and/or cooling systems having a central fluid heating and/or cooling plant and respective conduits for directing the heated or cooled fluid to individual rooms in a house or other building being serviced by the system. The zone control apparatus operates automatically to eliminate unnecessary heating of individual rooms to zones consisting of one or more rooms during cyclical periods of low or no use whereby substantial energy savings may be obtained with minimal compromise in comfort. More particularly, the zone control apparatus operates on the system to isolate or separate daytime and nighttime use areas of the house for selective heating or cooling only during their respective daytime or nighttime use or anticipated use periods.

Briefly, a zone control apparatus according to the invention comprises one or more flow control devices operatively associated with respective fluid conduits in the central heating and/or cooling system, and a cycle controller for cycling the flow control device or devices between high and low (or no) flow conditions at times strategically selected to correspond to periods of high and low use of the room or rooms with which the flow control device or devices are respectively associated. When in its low flow condition, each flow control device preferably closes off fluid flow through the associated conduit to eliminate direct heating or cooling of the associated room or, in the alternative, substantially restricts flow to permit nominal flow and nominal direct heating or cooling of the associated zone. As is contemplated, flow control devices associated with rooms having generally corresponding periods of high and low use such as during the day or night may be strategically grouped as a zone and together cycled by the cycle controller. As is preferred, the devices are cycled to their high flow condition prior to anticipated usage of the associated rooms by an amount of time sufficient to bring such rooms to desired temperature for comfortable changeover between day area and night area service. Also, the flow control devices preferably are located remote from the terminating ends of the fluid conduits to minimize heating or cooling losses associated with long fluid conduits.

Further in accordance with the invention, provision may be made for selective inclusion or exclusion of any room in a given programmed cycle for heating or cooling, or for shut-off of any one or most rooms or zones. Also embodied by the invention are specific forms of flow control devices. In forced air systems, control of air flow through the air ducts may be obtained by electrically or air operated dampers or by bladder valves installed in the air ducts. Specific preferred forms are set forth. Also embodied in the overall combination are specific cycle controllers and associated circuitry.

Overall the apparatus of the invention may be inexpensive and easily installed in new or existing heating and cooling systems. Along with substantial energy savings, the invention allows the usage of substantially smaller heating and/or cooling plants, extends the life of wear components in such plants, and allows reduced fan speeds in forced air systems. As a further important advantage, a single zone control apparatus according to the invention may operate year round to provide both heating and cooling savings in respective operational modes of dual purpose heating and cooling systems.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION

Figure 1:
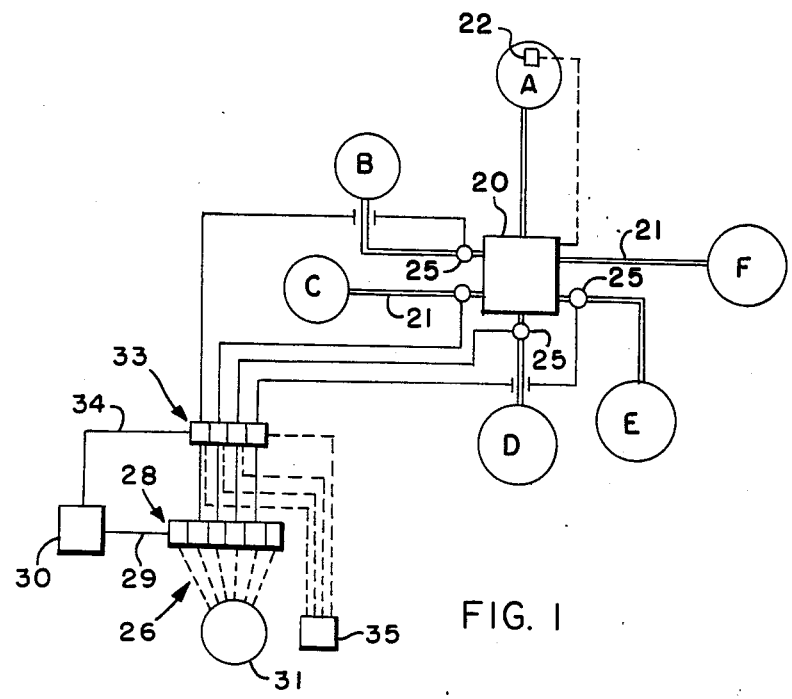
FIG. 1 is a diagrammatic illustration of a central heating and/or cooling system embodying a zone control apparatus according to the invention.

As indicated, FIG. 1 is a diagrammatic illustration of a central heating and/or cooling system embodying a zone control apparatus according to the invention. By way of example, the illustrated heating and/or cooling system includes a central fluid heating and/or cooling plant 20 and fluid conduits 21 extending from the plant to respective rooms to be heated or cooled by the system. The rooms are indicated by circles and differentiated by the letters A-F. In conventional operation of the system, fluid heated or cooled by the plant 20 is directed by the conduits 21 to respective rooms A-F for heating or cooling such rooms. Also in conventional manner, operation of the plant 20 may be controlled by a thermostat 22 located in one of the rooms such as room A. The thermostat may be set to a desired temperature whereupon the system operates automatically to maintain such temperature in the room containing the thermostat, hereinafter the control room. At the same time, the other rooms B-F will be heated or cooled absent any flow restrictions in associated conduits.

The foregoing generic description is generally applicable to various conventional types of central heating and/or cooling systems employed in residential and commercial buildings. In forced air systems, the plant 20 corresponds to a furnace and/or air conditioner, and the conduits 21 to air ducts through which temperature conditioned air is forced to vents or registers opening to the rooms A-F. In hot or cold water systems, the plant 20 corresponds to a water heater or cooler, and the conduits 21 to pipes through which hot or cold water is pumped to heat exchangers located in the rooms A-F. As for steam heating systems, the plant 20 corresponds to a boiler and the conduits 21 to pipes through which steam is directed to radiators located in the rooms A-F.

With further reference to FIG. 1, the zone control apparatus comprises one or more flow control devices 25 operatively associated with respective conduits 21 for controlling flow of conditioned fluid therethrough, and a cycle controller 26 for cycling the flow control devices between high and low flow conditions at respective preselected times. Each flow control device 25 in its high flow condition allows a high rate of fluid flow from the plant to the associated room for heating or cooling such room. In its low flow condition, each flow control device substantially restricts or preferably shuts off flow of conditioned fluid through the associated conduit thereby to separate or isolate the corresponding room from the plant and hence preclude direct heating or cooling of such room except perhaps by a nominal maintenance amount. That is, the flow control devices preferably cycle in most applications between full open and full closed positions. Consequently, the system will operate to heat or cool the various rooms only during those periods when the fluid control devices associated therewith are in their high flow condition. Preferably, the devices are located in the conduits remote from the rooms and proximate the plant to eliminate heating or cooling losses along their respective lengths. It perhaps should be noted that the rooms when thusly isolated or separated from the system still may be indirectly heated or cooled somewhat by reason of open doors and uninsulated interior walls which permit heat transfer between heated/cooled and unheated/uncooled rooms.

The cycle controller 26 may be of any suitable type operative to switch the flow control devices 25 between high and low flow conditions at preselected times. For most residential and commercial installations, the controller should have a minimum cycle period of 24 hours for operation in accordance with a 24-hour program schedule and respective timer controlled switches or the like for each flow control device or group thereof being individually controlled. Preferably, the controller includes a seven-day, 24-hour cycle timer which enables different program schedules for each day of the week, thus taking into account changes in room usage from day to day or from weekday to weekend. As will be appreciated, the number of required timer controlled circuits in the controller for connection to the flow control devices will vary from application to application.

In a preferred embodiment, the flow control devices 25 are pneumatically actuated between high and low flow conditions. Pneumatic actuators or pneumatically actuated components of the flow control devices are connected by air lines to respective valves collectively indicated at 28. The valves each may be connected to a single device as shown, there being provided a sufficient number of valves such as six in the illustrated embodiment. In the alternative, plural devices associated with the rooms in a single zone may be connected to a single valve for simultaneous operation. This could be done in those situations where several rooms having corresponding use and no use periods may be included in a single zone for common cycling.

The valves 28 of the controller 26 are commonly connected by an air line 29 to an air pressure source such as a compressor 30. Each valve has respective positions here designated open and closed for connecting the flow control devices 25 to the air pressure source 30 and to pressure relief means such as a vent to the atmosphere for actuation of the devices between high and low (preferably no) flow conditions. Movement of the valves between such open and closed positions is controlled by a timer mechanism 31 which may be preset to open and close the valves at respective times during cyclical operation thereof.

As is preferred, override valves 33 may be provided as indicated to maintain respective flow control devices 25 in their high or low flow conditions independently of the valves 28 and the timer mechanism 31. The override valves 33 may have a null position allowing cycle or program control by the timer mechanism, and respective open and closed positions for connecting the flow control devices to the air pressure source 30 via line 34 or to pressure relief means. The override valves may be of solenoid actuated type and connected by suitable circuitry (broken lines) to respective manually operated switches 35 in a control panel preferably located in the building at the thermostat 22 for centralized control of the heating and/or cooling system. Likewise, the timer mechanism 31 preferably is located in such control panel and connected by suitable circuitry (broken lines) to the valves 28 which may be located more proximate the compressor 30 or respective flow control devices 25. In the alternative, radio wave transmitters and receivers may be employed to provide for remote control of the various valves.

In any event, the foregoing components preferably operate such that the flow control devices 25 will move to and/or remain in their high flow or open conditions if a power or system failure would occur.

It is noted here that the "control" room containing the thermostat 22 is not and obviously should not be isolated from the plant 20 by a flow control device 25 for proper temperature controlled heating or cooling of the rooms not isolated from the plant at any given time. Preferably the control room is a main activity room of the house. It also is noted that the zone control apparatus is operative year round to provide energy savings and other advantages in both the heating and cooling modes of dual purpose heating and cooling systems employing the same conduits for heating and cooling.

In a typical residential application, the zones A-F may correspond to rooms or hallways of a house. For example, zones A-F respectively may be a den, living room, kitchen, first bedroom, second bedroom and bathroom. Consequently, living room B and kitchen C primarily are used during the day and early evening to the exclusion of bedrooms D and E which primarily are used during the night and early morning. On the other hand, bathroom F may be intermittently used any time of the day or night whereas the den A containing the thermostat 22 constitutes the control room.

To the achievement of significant energy savings with minimal compromise in comfort, the cycle controller 26 may be set, for example, so that the flow control devices 25 associated with living room B and kitchen C are in their high flow condition during the day and early evening and in their low flow condition during the night and early morning. Conversely, the controller may be set so that the flow control devices associated with the bedrooms D and E are in their high flow condition during the night and early morning and in their low flow condition during the day and early evening. Hence, the rooms B-E will be heated or cooled only during customary periods of use or contemplated use and not at other times. As should be apparent, each switching circuit of the controller at least would have two set points for switching the associated device to its high and low flow conditions at respective set times.

Preferably, the cycle controller 26 is set to switch the flow control devices 25 to their high flow condition in advance of the anticipated usage period for corresponding rooms to allow room warm-up prior to such anticipated usage of such rooms. Such overlap in day and night service provides a comfortable changeover without severe temperature changes at the beginning of a use or anticipated use period. For example, day service may commence one-half hour or so before night service is shut off and night service may commence one-half hour or so before day service is shut off.

Further in accordance with the invention, suitable controls may be provided to permit inclusion or exclusion of one or more of the flow control devices associated with a room or zone in a given program cycle for heating or cooling in order to provide individualized room or zone control. That is, appropriate override circuitry and components (33, 34, 35) may be provided to maintain upon selection any one or more flow control devices in their full flow or low flow conditions while the remaining devices are cycled in accordance with a given program. In a residential installation, such would allow, for example, daytime heating of a bedroom when utilized during the day. In commercial buildings, such would allow, for example, nighttime heating or cooling of an office normally not heated or cooled at night. This also may provide for selective heating of a low use room such as a conference room or spare office only when needed. In any application, it will be seen that any one or more rooms may be closed off such as for several days or weeks when it will not be used for some lengthy time.

Although the employment of a cycle controller is preferred and desirable, such may be replaced by manually operated switches or the like which control operation of the flow control devices. This still would allow selective heating or cooling of individual rooms or zones. Preferably, the manually operated switches are located at convenient locations in the heated or cooled facility such as adjacent the thermostat.

As will also be appreciated, a house, building, etc. may be strategically divided into any number of zones consisting of one or more rooms for selective heating or cooling of such zones, whether by programmed or manual electrical and/or fluidic control of associated flow control devices.

Figure 2:
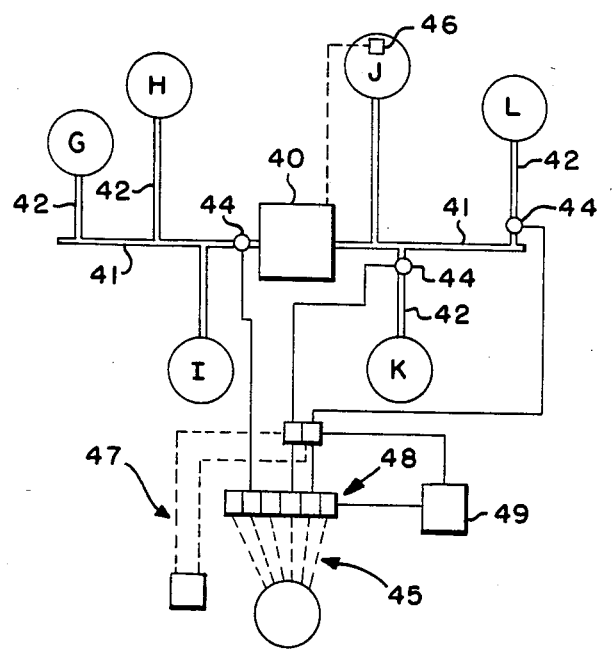
FIG. 2 is a diagrammatic illustration of another form of central heating system embodying a zone control apparatus according to the invention.

Referring now to FIG. 2, such is a diagrammatic illustration of another form of central heating and/or cooling system embodying a zone control apparatus according to the invention. The illustrated heating and/or cooling system includes a central fluid heating and/or cooling plant 40, main fluid conduits 41 radiating from the plant, and branch fluid conduits 42 extending from the main fluid conduits to respective rooms G–L to be heated or cooled by the system.

In the event that the rooms connected to one of the main conduits 41 have coinciding cyclical periods of use and non-use, the zone control apparatus need only employ one flow control device 44 in such main conduit upstream of the branch conduits connected thereto for collectively controlling heating or cooling of such rooms which may be considered to be one of a number of zones consisting of one or more rooms. Of course, individual flow control devices may be provided in each branch conduit connected to the main conduit for common or other cycling between high and low (or no) flow conditions by the cycle controller 45. With regard to the rooms connected to the other main duct which may have differing cyclical periods of use and non-use and thus may be considered separate zones, respective flow control devices 44 may be installed in the branch conduits 42 feeding such rooms and individually controlled by the controller 45. No flow control device is provided in the conduit path leading to the zone J containing the thermostat 46. Override circuitry and components may be provided as indicated at 47 and a pressure source connected to valves 48 of the controller is indicated at 49.

Although the invention broadly contemplates the usage of any suitable type of flow control device for any given central heating and/or cooling system, the selection thereof in part will depend on the type of system. In hot or cold water systems or steam heating systems, the flow control devices may be electrically or pneumatically operated valves installed in the room feeder pipes and which open and close on command from the cycle controller. In forced air systems, the flow control devices may be electrically or pneumatically operated dampers installed in the air ducts for movement between open and closed positions in response to cycle controller commands. Such dampers may be of pivoting or guillotine type. When pneumatically operated flow restricting dampers, valves, etc. are employed as the flow control devices, as is preferred, such may be controlled in the manner discussed above in connection with FIG. 1.

If desired, any of the foregoing types of fluid control devices may be provided with half, three-quarter or other positions for multi-stage control so that service can be further tailored for the individual rooms as by providing minimal or partial service. As previously indicated, each device would be installed in the pipe or duct serving the individual or group of rooms to be controlled thereby.

The electrical circuitry of the zone control apparatus preferably is of low voltage. Each flow control device may be provided with two wire service with control be effected by signals generated by the cycle controller such as carrier signals which are interpeted by a carrier decoder at each device. In the case of pneumatic actuation of the flow control devices, pneumatic operation may be controlled by an electrical cycle controller through solenoid operated valves as in the manner previously discussed.

Referring now to FIGS. 3–11, several preferred forms of flow control devices utilizing inflatable bladders, bags or balloons are shown as employed in an air duct of a forced air system. In each case, the bladder or bladders may be selectively connected by means controlled by the cycle controller of the zone control apparatus to a source of pressurized air and to the atmosphere respectively to inflate and deflate the bladders. Such means, for example, may include a solenoid actuated valve which is moved between inflate and deflate positions in response to command signals received from the cycle controller.

Figure 3:
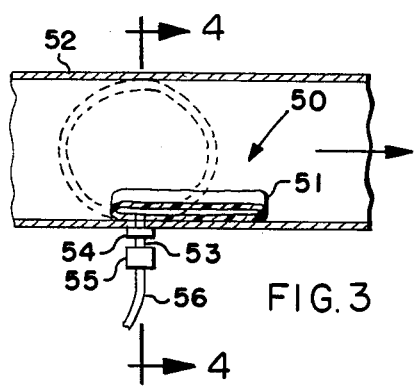
FIG. 3 is a longitudinal section through an installed bladder-type flow control device having use in the zone control apparatus.
Figure 4:
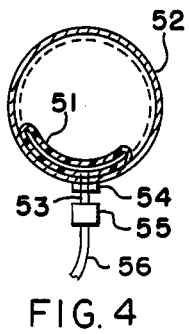
FIG. 4 is a transverse section through the device of FIG. 3 taken substantially along the line 4—4 thereof.

In FIGS. 3 and 4, one form of bladder-type flow control device is designated generally by reference numeral 50 and can be seen to include a bladder 51 located interiorly of an air duct 52. The bladder is secured in place by its air inlet fitting 53 which extends through and is fixed to a side wall of the duct by a nut 54. Connected by coupling 55 to the fitting is an air supply line 56 which may be selectively connected to a source of pressurized air and to the atmosphere as previously indicated. In an alternative arrangement, the bladder fitting may be in the form of a rubber tube or nozzle which extends through a hole in the duct wall for connection to a rubber or plastic air line which may be stretched and slipped over the projecting rubber tube.

When deflated as seen in solid lines, the bladder 51 lays substantially flush to the side wall of the duct 52 to allow substantially unrestricted flow of hot or cold air through the duct. When inflated as seen in broken lines, the bladder balloons outwardly and conforms to the interior shape of the duct thereby to shut off air flow through the duct. Because of its flexibility and ability to conform to the shape of the duct, the bladder provides an effective means for completely sealing off air flow.

To facilitate closure of the air duct, the bladder may be elastic (like a balloon) and/or preformed to have an inflated shape generally corresponding to the shape of the duct which typically is either circular or rectangular in transverse cross section. The bladder may be made of any material suitable for the particular application. A preferred bladder for hot air systems is one having a glass fabric substrate and a heat resistant silicon resin coating. The bladder also may be made of heat resistant plastic or rubberized canvas.

Figure 5:
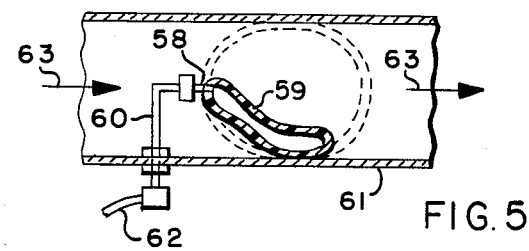
FIG. 5 is a longitudinal section through another form of bladder-type flow control device.

FIG. 5 shows a modified device somewhat similar to the FIGS. 3 and 4 embodiment. As shown, the inlet fitting 58 of a bladder 59 is connected to one end of a rigid pipe 60 which has its other end fixed to and extending through the side wall of a duct 61 for connection to an air supply line 62. The pipe extends radially to the center of the duct thereby to position the point of bladder securement centrally in the duct. Preferably such point of securement is at the upstream end of the duct, air flow through the duct being indicated by arrows 63. When deflated as seen in solid lines, the bladder hangs downwardly and may partly rest on the bottom wall of the duct. When inflated as seen in broken lines, the bladder axially centers itself on its point of securement and conforms to the interior shape of the duct thereby to shut off fluid flow.

Figure 6:
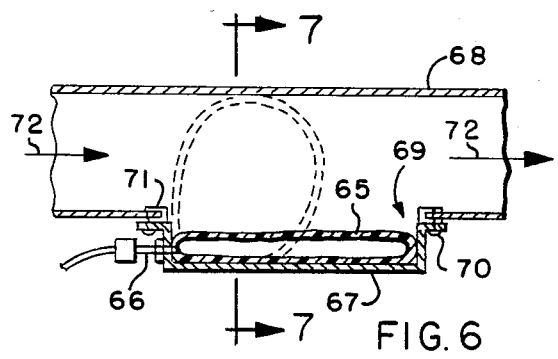
FIG. 6 is a longitudinal section through still another form of bladder-type flow control device according to the invention.
Figure 7:
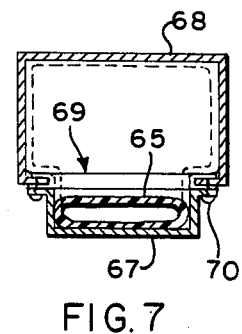
FIG. 7 is a transverse section through the device of FIG. 6 taken substantially along the line 7—7 thereof.

As seen in FIGS. 6 and 7, a bladder 65 may be secured at its fitting 66 to a side wall of a shallow dish-like or pan-like compartment 67 which in turn is secured to a side wall of a duct 68 at an opening 69 therein. When deflated as seen in solid lines, the bladder collapses fully into the compartment to eliminate any obstruction to flow through the duct. When inflated, the bladder expands or balloons out of the compartment to its broken line position shutting off air flow through the duct. Such arrangement provides for easy installation of the device in previously installed air ducts, this being accomplished, for example, by cutting a hole in the duct corresponding to the open end of the compartment. The compartment then may be secured to the duct as at flanges by fasteners 70 with the open end thereof coinciding with the opening in the duct. Preferably, tape 71 is wrapped around the cut edge of the duct to prevent damage to the bladder. Also, the bladder preferably is secured at its fitting to the upstream end wall of the compartment, air flow through the duct being indicated by arrows 72.

Figure 8:
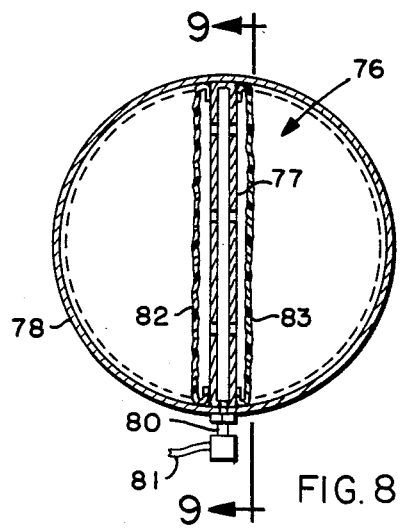
FIG. 8 is a longitudinal section through yet another form of bladder-type flow control device.
Figure 9:
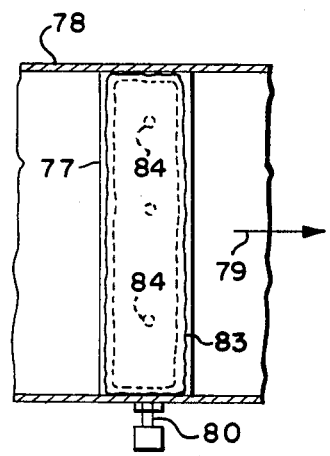
FIG. 9 is a transverse section through the device of FIG. 8 taken substantially along the line 9—9 thereof.
Figure 12:
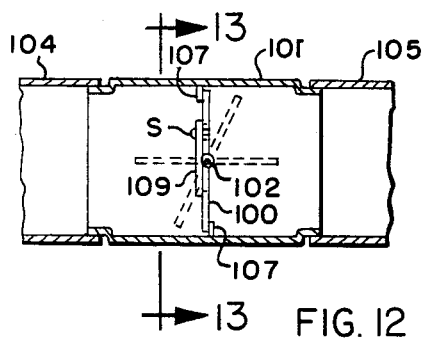
FIG. 12 is a longitudinal section through a damper-type flow control device according to the invention.
Figure 13:
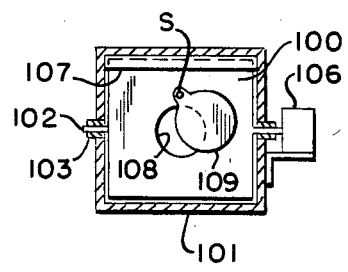
FIG. 13 is a transverse section through the device of FIG. 12 taken substantially along the line 13—13 thereof.

FIGS. 8 and 9 show a dual bladder flow control device 76 comprising a hollow plate-like support member 77 secured within a duct 78 and extending parallel to the air flow path 79 through the duct. At one end adjacent a side wall of the duct, the support member 77 is connected by a suitable fitting 80 to an air supply line 81. Secured to opposite sides of a support member about its periphery are respective bladders 82 and 83. The interior space defined by each bladder and the adjacent side of the support member is in fluid communication with the interior of the support member by means of air holes 84 provided in the side walls of the support. When deflated, each bladder substantially lies flat against the adjacent face of the support as seen in solid lines. When inflated, the bladders expand outwardly away from the support and conform to the interior half-shape of the duct at the respective side of the support to close off air flow through the duct. In the case of a circular duct, each bladder assumes a semicircular shape as shown in broken lines.

Figure 10:
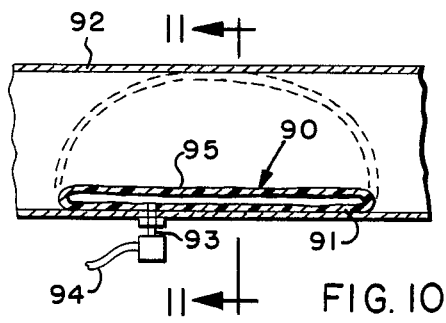
FIG. 10 is a longitudinal section through a bladder-type flow control device particularly suited for actuation by pressurized liquid.
Figure 11:
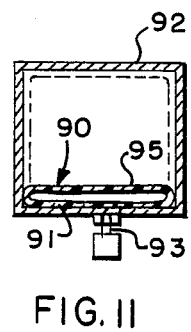
FIG. 11 is a transverse section through the device of FIG. 10 taken substantially along the line 11—11 thereof.

Referring now to FIGS. 10 and 11, another embodiment of flow control device can be seen to employ a liquid pressure operated bladder or bellows 90. The bladder 90 may have a relatively rigid bottom wall 91 secured flush with a side wall of a duct 92 by a fitting 93 connected to a liquid supply line 94. The bladder further includes an expandable elastic portion 95 peripherally joined to the relatively rigid portion which, when deflated or relaxed, lies substantially flat on the relatively rigid portion. When liquid is supplied under pressure to the interior of the bladder, the elastic portion 95 expands outwardly to shut off fluid flow through the duct as seen in broken lines. If desired, city water pressure may be utilized to expand the bladder.

Turning now to FIGS. 12–17, several preferred types of damper-type flow control devices are illustrated. The device seen in FIGS. 12 and 13 comprises a damper 100 having a shape corresponding to the cross sectional shape of a duct section 101 in which it is mounted. The damper has diametrically opposed end journals 102 rotatably supported in bearings 103 fixed to respective opposite side walls of the duct whereby the damper swings on a diametric axis thereof which extends transversely with respect to the duct. The duct section 101 has inwardly offset axially extending end portions for insertion in and between separated ducts or duct portions 104 and 105 as shown.

Swinging movement of the damper 100 is obtained by an electric or air motor or solenoid 106 secured outside the duct and connected to one of the end journals 102 of the damper. The motor may be electrically or pneumatically controlled in response to commands received from the cycle controller of the zone control apparatus. The damper may be swung in either direction by the motor or in one direction against biasing means such as a spring which urges the damper either to an open or closed position. The closed position of the damper is determined by positive stops 107 fixed to the interior sides of the duct for engagement with the free swinging ends of the damper. Such stops may be provided with suitable sealing means to ensure substantially complete shut-off of air flow when the damper is in its closed position. In response to commands from the cycle controller, the damper is swung between its closed and full open positions respectively shown in solid and broken lines to allow or shut off air flow through the duct. If desired, the damper may be housed within an insert having opposed circular walls corresponding to the swing path of the damper.

For adjustable partial service when closed, the damper 100 may be provided with an aperture 108 which is opened and closed by a cover plate 109 secured flush to a face of the damper by a screw S or other suitable fastener. The screw when loose defines a pivot for the cover plate which may be swung to a position completely closing the opening or only covering a portion of the opening by a desired amount permitting correspondingly limited flow through the duct when the damper is closed. Once adjusted, the cover plate may be secured in place by tightening the screw.

Figure 14:
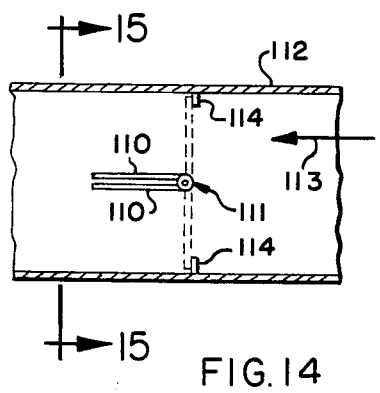
FIG. 14 is a longitudinal section through another form of damper-type flow control device.
Figure 15:
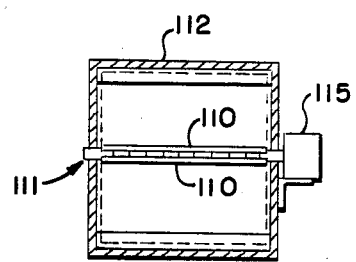
FIG. 15 is a transverse section through the device of FIG. 14 taken substantially along the line 15—15 thereof.

In FIGS. 14 and 15, another form of damper assembly can be seen to include a pair of damper half plates 110 mounted at their inner ends by a hinge assembly 111 for swinging movement about a common axis extending transversely through a duct 112 at the center thereof. When in their open solid line position, the damper plates extend adjacent to one another parallel to the air flow path 113 through the duct. To close off flow through the air duct, the dampers are swung outwardly away from each other and against respective stops 114 affixed to opposite side walls of the duct. Any suitable means such as an air motor 115 may be employed to move the dampers between open and closed positions with or without biasing means normally urging the plates to either their closed or preferably their open position.

Figure 16:
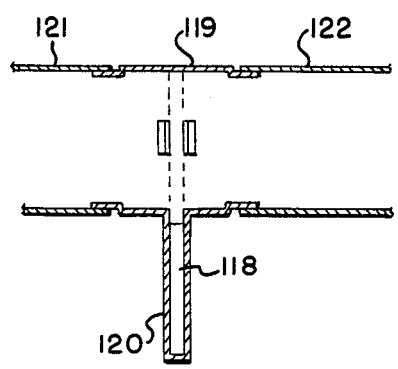
FIG. 16 is a longitudinal section through another form of damper-type flow control device.

In FIG. 16, a guillotine-type damper assembly can be seen to employ a slide gate 118 which is mounted for transverse movement in a duct insert 119 between open and closed positions respectively shown in broken and solid lines. When in its open position, the gate resides in a track housing 120 transversely offset from the air flow path through the insert 119 and connected duct sections 121 and 122. When closed, the gate extends across the air flow path thereby to prevent air flow through the duct. Any suitable means may be employed to actuate the slide gate such as a solenoid or fluid motor device.

Figure 17:
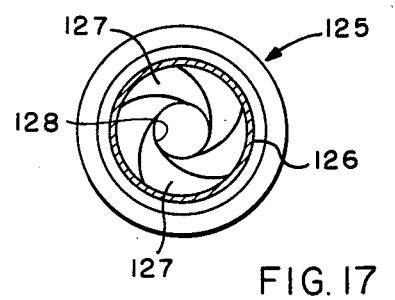
FIG. 17 is a transverse section through a shutter-like flow control device.

In FIG. 17, still another form of flow control device can be seen to employ a shutter-like mechanism 125 for permitting and preventing air flow through the duct 126. Such mechanism 125 includes an annular array of shutter elements or petals 127 which interiorly define an aperture 128. The shutter-like mechanism may be of any suitable construction and actuated by any suitable means controlled by the cycle controller. As will be appreciated, such a mechanism may be provided with adjustable stops which determine the extent of opening or closing movement to provide various degrees of partial service such as 20%, 40%, etc. That is, the mechanism may open to an aperture size 50% of the duct service to provide only half service to the associated room or zone when cycled to its high flow condition as when it is desired to maintain such room or zone at a different temperature than the control room containing the heating and/or cooling system thermostat.

Figure 18:
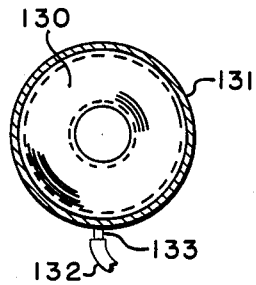
FIG. 18 is a transverse section through another form of bladder-type flow control device.

Turning now to FIG. 18, another form of bladder type flow control device can be seen to employ a bladder 130 having a donut shape when inflated which allows reduced air flow through the duct 131. When deflated to its high flow condition, the bladder may collapse onto the bottom of the duct where it is secured in place and to an air line 132 by its fitting 133.

Figure 19:
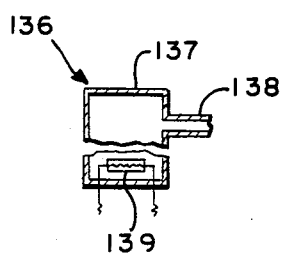
FIG. 19 is a section through an actuator operative to effect opening and closing movement of a flow control device.

Referring now to FIG. 19, a desired form of actuator useful with a flow control device is indicated generally at 136. The actuator comprises a reservoir or container 137 for a gas which may be connected, for example, to the fluid motor 106 of the device seen in FIGS. 12 and 13, by a gas line 138. Located within the container is a heater 139 operative when energized to heat the gas thereby to cause the same to expand. As it expands, the gas will flow under pressure to the fluid motor thereby to actuate the same to effect opening or closing of the associated flow control device. When the heater is turned off, the gas will contract and return to the container to allow restoration of the flow control device to its original position, be it open or closed. As will be appreciated, energization and deenergization of the heater may be controlled by a cycle controller or other controlling device to effect operation of the associated flow control device in the aforedescribed manner. In the case of a bladder-type flow control device, the gas line 138 may be connected directly to the bladder for inflation upon energization of the heater and deflation when the heater is turned off.

Although the invention has been shown and described with respect to preferred embodiments, it is obvious that equivalent alterations and modifications will occur to others skilled in the art upon the reading and understanding of the specification. The present invention includes all such equivalent alterations and modifications, and is limited only by the scope of the following claims.

I claim:

1. In combination with a central heating and/or cooling system having a source of conditioned fluid controlled by a thermostat in one energizing circuit for the source of conditioned fluid and respective conduits for directing the conditioned fluid to respective zones for conditioning the environment thereof, a zone control apparatus comprising at least one flow control means operatively associated with a respective one of said conduits for controlling fluid flow therethrough, and a second energizing circuit for said flow control means separate and independent from said one energizing circuit, said second energizing circuit including cycle controller means for automatically cycling and actuating independently of the thermostat said flow control means between high and low flow conditions at preselected times.

2. The combination of claim 1, wherein said flow control means completely shuts off flow when in its low flow condition.

3. The combination of claim 1, wherein there are plural flow control means operatively associated with respective conduits, and said cycle controller means is operative to cycle each flow control means at respective preselected times.

4. The combination of claim 3, wherein said zones are strategically grouped into at least two groups, and the flow control means associated with each group are together cycled by said cycle controller means at corresponding preselected times.

5. The combination of claim 4, wherein said zones are strategically grouped into a day activity group and a night activity group, and wherein the flow control means associated with the day and night activity groups respectively are in their high and low flow conditions during the day and in their low and high flow conditions during the night.

6. The combination of claim 5, wherein the flow control means associated with each group are cycled by said controller means to their low flow condition after the flow control means associated with the other group are cycled to their high flow condition to provide an overlap in day and night service without substantial temperature change at the beginning of respective activity periods.

7. The combination of claim 3, further comprising manual override means for disabling automatic cycling of any one or more flow control means by said controller means.

8. The combination of claim 7, wherein said manual override means includes means to switch disabled flow control means to either their high flow condition or their low flow condition independently of said controller means.

9. The combination of claim 1, wherein each flow control means is fluidically actuated between its high and low flow conditions, and said controller means includes timer controlled valves for selectively connecting respective flow control means to a source of pressurized fluid.

10. The combination of claim 9, wherein the conditioned fluid is hot or cold air and said conduits are ducts for directing such air from the source thereof to respective zones, and wherein each flow control means includes obstruction means movable between positions permitting and blocking flow through the associated duct and fluid means for effecting movement between such positions.

11. The combination of claim 10, wherein said obstruction means is a fluid expandable bladder.

12. The combination of claim 11, wherein said bladder when deflated collapses into a compartment at a side wall of the duct and out of the flow path of air through the duct.

13. The combination of claim 11, wherein there are two bladders secured to opposite sides of a plate-like support secured diametrically in the duct parallel to the air flow path through the duct.

14. The combination of claim 10, wherein said obstruction means includes a damper plate mounted in the duct for movement between flow permitting and obstructing positions.

15. The combination of claim 14, wherein there are two damper plates mounted in the duct for pivotal movement about a diameter of the duct in opposite directions.

16. A zone control apparatus for central heating and/or cooling systems having a source of conditioned fluid controlled by a thermostat in an energizing circuit for the source of conditioned fluid and respective conduits for directing the conditioned fluid to respective zones for conditioning the environment therein, said apparatus comprising plural flow control means for controlling fluid flow through respective conduits, and an energizing circuit for said flow control means separate and independent from the energizing circuit for the source of conditioned fluid, said energizing circuit for said flow control means including cycle controller means for automatically cycling and actuating independently of the thermostat each flow control means between high and low flow conditions at preselected times thereby to permit and shut-off heating or cooling of respective zones as during their cyclical periods of use and non-use, respectively.

17. The apparatus of claim 16, wherein said cycle controller means includes a 24-hour timer and timer controlled circuits, and means operatively connecting said circuits to respective flow control devices for commanding operation of the latter between their high and low flow conditions at respective preset times.

18. The apparatus of claim 16, wherein each flow control means is fluidically actuated between its high and low flow conditions, and said controller means includes timer controlled valves for selectively connecting respective flow control means to a source of pressurized fluid.

19. The apparatus of claim 18, wherein the conditioned fluid is hot or cold air and said conduits are ducts for directing such air from the source thereof to respective zones, and wherein each flow control means includes obstruction means movable between positions permitting and blocking flow through the associated duct and fluid means for effecting movement between such positions.

20. The apparatus of claim 19, wherein said obstruction means is a fluid expandable bladder.

21. In combination with a central heating and/or cooling system having a source of conditioned fluid controlled by a thermostat in one energizing circuit for the source of conditioned fluid and respective conduits for directing the conditioned fluid to respective zones for conditioning the environment thereof, a zone control apparatus comprising plural flow control means operatively associated with respective conduits for controlling fluid flow therethrough, a second energizing circuit for said flow control means separate and independent from said one energizing circuit, said second energizing circuit including cycle controller means for automatically cycling each flow control means between high and low flow conditions at preselected times, and accessibly located, plural selectable switch means each operative independently of said cycle controller means to switch a respective flow control means between high and low flow conditions.

22. In combination with a central heating and/or cooling system having a source of conditioned fluid and respective conduits for directing the conditioned fluid to respective zones for conditioning the environment thereof, a zone control apparatus comprising at least one flow control means operatively associated with a respective one of said conduits for controlling fluid flow therethrough, and cycle controller means for automatically cycling said flow control means between high and low flow conditions at preselected times, said flow control means including a fluid expandable bladder mounted to a respective conduit for expansion therein, said bladder being expandable to conform to the interior shape of the conduit thereby substantially completely to shut off fluid flow through the conduit, and said controller means including a timer controlled valve for selectively connecting said bladder to a source of pressurized fluid.

23. The combination of claim 22, wherein said bladder has a fluid inlet fitting by which said bladder is mounted to the conduit and connected to a source of pressurized fluid via said timer controlled valve.

24. The combination of claim 22, wherein said bladder, when deflated, lies substantially flush to a wall of the conduit.

25. A zone control apparatus for central heating and/or cooling systems having a source of conditioned fluid and respective conduits for directing the conditioned fluid to respective zones for conditioning the environment therein, said apparatus comprising plural flow control means for controlling fluid flow through respective conduits, and cycle controller means for automatically cycling each flow control means between high and low flow conditions at preselected times thereby to permit and shut-off heating or cooling of respective zones as during their cyclical periods of use and non-use, respectively, each flow control means including a fluid expandable bladder mountable to a respective conduit for expansion therein, said bladder being expandable to conform to the interior shape of the conduit thereby substantially completely to shut off fluid flow through the conduit, and said controller means including timer controlled valves for selectively connecting respective flow control means to a source of pressurized fluid.

26. The apparatus of claim 25, wherein said bladder has a fluid inlet fitting by which said bladder may be mounted to the conduit and connected to a source of pressurized fluid via said timer control valve.

27. In combination with a central heating and/or cooling system having a source of conditioned fluid and respective conduits for directing the conditioned fluid to respective zones for conditioning the environment thereof, a zone control apparatus comprising at least one flow control means operatively associated with a respective one of said conduits for controlling fluid flow therethrough, and cycle controller means for automatically cycling said flow control means between high and low flow conditions at preselected times, said flow control means including a fluid expandable bladder mounted to a respective conduit for expansion therein to block flow through the conduit, and said controller means including a timer controlled valve for selectively connecting said bladder to a source of pressurized fluid, and wherein said bladder, when deflated, lies substantially flush to a wall of the conduit and is housed in a shallow compartment secured and outwardly offset to a wall of the conduit.

28. A zone control apparatus for central heating and/or cooling systems having a source of conditioned fluid and respective conduits for directing the conditioned fluid to respective zones for conditioning the environment therein, said apparatus comprising plural flow control means for controlling fluid flow through respective conduits, and cycle controller means for automatically cycling each flow control means between high and low flow conditions at preselected times thereby to permit and shutoff heating or cooling of respective zones as during their cyclical periods of use and non-use, respectively, each flow control means including a fluid expandable bladder mountable to a respective conduit for expansion therein to block flow through the conduit, and said controller means including timer controlled valves for selectively connecting respective flow control means to a source of pressurized fluid, and further comprising a shallow compartment securable to a wall of the conduit in outwardly offset relationship for housing therein said bladder when deflated.

* * * * *